US009947921B2

United States Patent
Kajita

(10) Patent No.: US 9,947,921 B2
(45) Date of Patent: Apr. 17, 2018

(54) SILICON-CARBON COMPOSITE MATERIAL INCLUDING LAYERED CARBON AND SILICON PARTICLES

(71) Applicant: Panasonic Intellectual Property Management Co., Ltd., Osaka (JP)

(72) Inventor: Susumu Kajita, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 57 days.

(21) Appl. No.: 15/176,164

(22) Filed: Jun. 8, 2016

(65) Prior Publication Data

US 2016/0380265 A1 Dec. 29, 2016

(30) Foreign Application Priority Data

Jun. 23, 2015 (JP) ................................. 2015-125768

(51) Int. Cl.
| | | |
|---|---|---|
| H01M 4/36 | (2006.01) | |
| H01M 10/0525 | (2010.01) | |
| H01M 4/38 | (2006.01) | |
| H01M 4/587 | (2010.01) | |
| H01M 4/62 | (2006.01) | |
| C01B 33/00 | (2006.01) | |
| C01B 32/00 | (2017.01) | |
| H01M 4/133 | (2010.01) | |
| H01M 4/134 | (2010.01) | |

(52) U.S. Cl.
CPC ............. *H01M 4/366* (2013.01); *C01B 32/00* (2017.08); *C01B 33/00* (2013.01); *H01M 4/386* (2013.01); *H01M 4/587* (2013.01); *H01M 4/625* (2013.01); *H01M 10/0525* (2013.01); *H01M 4/133* (2013.01); *H01M 4/134* (2013.01)

(58) Field of Classification Search
CPC ...... H01M 4/366; H01M 4/386; H01M 4/587; H01M 4/625; H01M 4/133; H01M 4/134; H01M 10/0525; C01B 32/00; C01B 33/00
See application file for complete search history.

(56) References Cited

U.S. PATENT DOCUMENTS

| | | | |
|---|---|---|---|
| 2005/0214644 A1* | 9/2005 | Aramata | ............... H01M 4/386 429/218.1 |
| 2009/0029256 A1 | 1/2009 | Mah et al. | |
| 2014/0302396 A1 | 10/2014 | Lu et al. | |

FOREIGN PATENT DOCUMENTS

| | | |
|---|---|---|
| JP | 2009-032693 | 2/2009 |
| JP | 2010-282942 | 12/2010 |
| JP | 2013-187097 | 9/2013 |
| JP | 2015-503185 | 1/2015 |
| WO | 2013/141104 | 9/2013 |

* cited by examiner

*Primary Examiner* — Laura Weiner

(74) *Attorney, Agent, or Firm* — McDermott Will & Emery LLP

(57) ABSTRACT

A silicon-carbon composite material includes: layers of carbon material; and secondary particles of silicon held between the layers of the carbon material. Each of the secondary particles of silicon is an aggregate of primary particles of silicon. At least one of the primary particles of silicon has a diameter 3 nm or more. At least one of the secondary particles of silicon has a diameter of 50 nm or less.

6 Claims, 4 Drawing Sheets

SILICON-CARBON COMPOSITE MATERIAL INCLUDING LAYERED CARBON AND SILICON PARTICLES

BACKGROUND

1. Technical Field

The present disclosure relates to a silicon-carbon composite material and a method for manufacturing it.

2. Description of the Related Art

Composite materials that contain silicon and a carbon material are under research as anode materials that improve the capacities of lithium-ion batteries. The theoretical electrochemical capacity of lithium-intercalated silicon ($Li_{22}Si_5$) is 10 times or greater than that of the commonly used lithium-intercalated graphite ($LiC_6$).

For example, Japanese Unexamined Patent Application Publication (Translation of PCT Application) No. 2015-503185 discloses a nanosilicon-carbon composite material for use as an anode of a lithium-ion battery. This material includes a carbon base and nanosilicon dispersed thereon.

SUMMARY

A silicon-carbon composite material according to an aspect of the present disclosure includes: layers of carbon material; and secondary particles of silicon held between the layers of the carbon material, each of the secondary particles of silicon being an aggregate of primary particles of silicon, at least one of the primary particles of silicon having a diameter of 3 nm or more, at least one of the secondary particles of silicon having a diameter of 50 nm or less.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
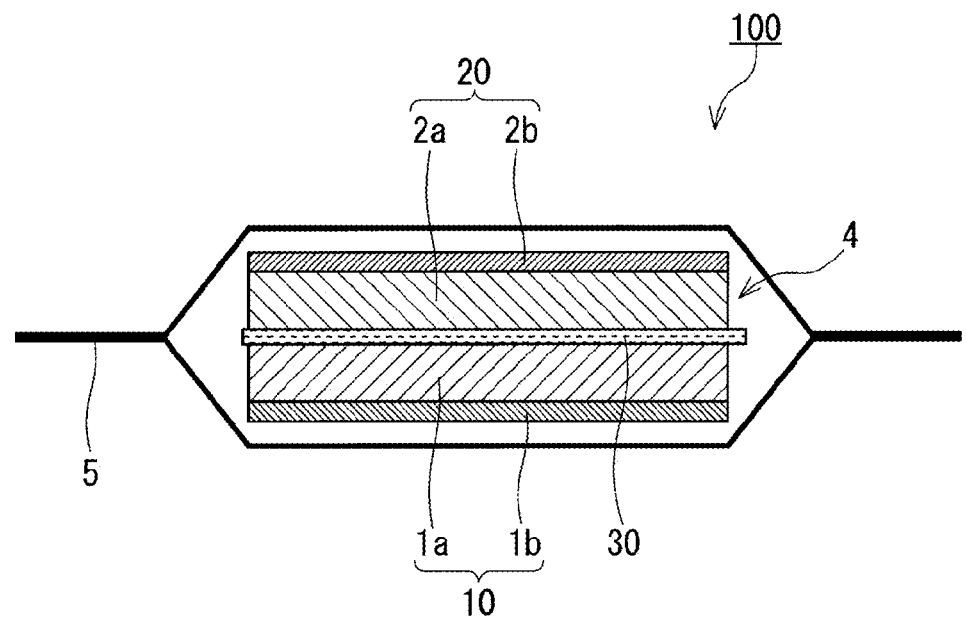
FIG. 1 is a cross-sectional diagram that illustrates an example of a configuration of a lithium-ion battery according to this embodiment.

Underlying Knowledge Forming Basis of the Present Disclosure

When a composite material that includes silicon and a carbon material is used as an anode of a lithium-ion battery, the silicon absorbs lithium to form $Li_{22}Si_5$. The change in volume associated with the transformation from silicon to $Li_{22}Si_5$ is, however, as large as 420%. This makes known silicon-carbon composite materials unstable in terms of the silicon-to-silicon and silicon-to-carbon electrical connections in their anodes. Stabilizing these electrical connections requires making up a nanoscale composite of silicon and the carbon material.

Unfortunately, known manufacturing methods fail to combine a carbon material with silicon nanoparticles reduced in size to a particular diameter. Furthermore, it has been found that in known manufacturing methods, the proportion of the volume of oxidized layers, formed on the surfaces of the silicon particles, to that of the silicon particles increases with decreasing diameter of the silicon particles. These oxidized layers, which do not contribute to the charge and discharge process, may affect the efficiency of the silicon particles in charging and discharging. Moreover, there are no commercially available silicon particles with diameters of less than 30 nm, and silicon particles as small as 30 nm are likely to aggregate. Thus, it has been difficult to produce a composite material containing fine particles of silicon and a carbon material.

With this knowledge as the basis, the inventors investigated novel silicon-carbon composite materials and reached the present disclosure.

Overview of Embodiments

A silicon-carbon composite material according to an aspect of the present disclosure includes a layered carbon material that is a stack of a plurality of layers, and a plurality of secondary particles of silicon held between the layers of the carbon material. Each of the secondary particles of silicon is an aggregate of a plurality of primary particles of silicon. At least one of the primary particles of silicon has a diameter of 3 nm or more. At least one of the secondary particles of silicon has a diameter of 50 nm or less.

This composite material can stabilize the electrical connections between primary particles of silicon, between secondary particles of silicon, and/or between these kinds of silicon particles and the carbon material. For example, this composite material can maintain good electrical connections even when the primary and/or secondary particles of silicon experience a change in volume due to absorption of lithium ions into silicon.

In the silicon-carbon composite material, for example, the diameter of the at least one of the primary particles of silicon may be less than 20 nm, and that of the at least one of the secondary particles of silicon may be 5 nm or more.

In the present disclosure, a primary particle of silicon is a unit particle that forms part of a secondary particle, or an aggregate, of silicon. A silicon particle can be determined primary or secondary on the basis of its geometry observed in its cross-sectional TEM image.

In the present disclosure, a diameter of a particle refers to one measured as follows. First, the lengths of the major and minor axes, a and b, of the particle are measured in a cross-sectional STEM image. Then the average of the two lengths, (a+b)/2, is calculated. The result is designated the diameter of the particle.

In the silicon-carbon composite material, for example, the primary particles of silicon may have an average diameter of 3 nm or more, and the secondary particles of silicon may have an average diameter of 50 nm or less.

In the silicon-carbon composite material, for example, the average diameter of the primary particles of silicon may be less than 20 nm, and that of the secondary particles of silicon may be 5 nm or more.

In the present disclosure, an average diameter of primary particles of silicon is obtained by measuring and calculating the diameters of any 300 primary particles of silicon in the composite material in a TEM image using the method described above, and then dividing the sum of the obtained particle diameters by 300. Likewise, an average diameter of secondary particles of silicon is obtained by measuring and calculating the diameters of any 300 secondary particles of silicon in the composite material in a TEM image using the method described above, and then dividing the sum of the obtained particle diameters by 300.

The silicon-carbon composite material may further include, for example, amorphous carbon. Amorphous carbon can stabilize the silicon-to-silicon and/or silicon-to-carbon electrical connections, thereby enhancing conductivity of the composite material.

A lithium-ion battery according to an aspect of the present disclosure includes an anode, a cathode, and an electrolyte. The anode contains the above-noted silicon-carbon composite material, and the electrolyte contains a lithium salt.

This lithium-ion battery can maintain electrical connections in a stable manner even when the primary and/or secondary particles of silicon in the anode experience a change in volume due to absorbing lithium ions.

A method according to an aspect of the present disclosure for manufacturing a silicon-carbon composite material includes: producing a composite material containing siloxane and a layered carbon material from an organic silicon compound and a layered oxidized graphite; heating the composite material in a non-oxidizing atmosphere containing magnesium vapor to reduce the siloxane into silicon; and removing a component of the composite material excluding the silicon and the carbon material.

This method yields a silicon-carbon composite material in which silicon particles are held between the layers of the carbon material. The diameters of the silicon particles can be, for example, smaller than those of known silicon particles. Furthermore, the proportion of the volume of oxidized layers on the surfaces of the silicon particles to the total volume of the silicon particles can be reduced. Thus, the efficiency of silicon in charging and discharging can be improved.

In this method, for example, the organic silicon compound may be an alkoxysilane that has no alkyl groups. This provides, for example, a composite material that has no Si—$CH_3$ bonds.

In the method, for example, the removal of a component of the composite material excluding the silicon and the carbon material may be achieved through washing of the composite material in an aqueous solution of an acid or ammonium salt. This is an efficient way to remove a component of the composite material other than silicon and carbon.

Alternately, the removal of a component of the composite material excluding the silicon and the carbon material may be achieved through heating of the composite material in a non-oxidizing atmosphere. This allows the manufacturer to, for example, decompose $Mg_2Si$.

Embodiment

The following describes an embodiment of the present disclosure. The following statements only relate to an example of the present disclosure; the present disclosure is not limited to these statements.

[1. Silicon-Carbon Composite Material]

A silicon-carbon composite material according to this embodiment includes a layered carbon material and multiple secondary particles of silicon held between the layers of the carbon material. Each of the secondary particles of silicon is an aggregate of multiple primary particles of silicon.

The carbon material in this embodiment can be any layered carbon material. An example is graphite.

One of the primary particles of silicon has a diameter of 3 nm or more, and one of the secondary particles of silicon has a diameter of 50 nm or less. The diameter of the primary particle of silicon may be, for example, less than 20 nm. The primary particles of silicon may have an average diameter of 3 nm or more, and the secondary particles of silicon may have an average diameter of 50 nm or less. The average diameter of the primary particles of silicon may be, for example, less than 20 nm.

The composite material according to this embodiment may further contain amorphous carbon. Examples of amorphous carbon include carbon black. The amorphous carbon serves as a conductive agent and can further stabilize the silicon-to-silicon and/or silicon-to-carbon material electrical connections in the composite material.

[2. Method for the Manufacture of the Silicon-Carbon Composite Material]

The composite material according to this embodiment can be manufactured by, for example, the following method.

A composite material containing a layered carbon material and siloxane is produced from a layered oxidized graphite and an organic silicon compound. The composite material is heated in a non-oxidizing atmosphere containing magnesium vapor to reduce the siloxane into silicon. A component of the composite material excluding the silicon and the carbon material is then removed.

This provides a nanoscale composite of nanosilicon and a carbon material. Through the reduction of siloxane into nanosilicon, the silicon particles are produced with greatly reduced formation of oxidized layers on their surfaces.

The following describes a specific example of a method for the manufacture of the silicon-carbon composite material.

[2-1. Preparation of Oxidized Graphite]

The oxidized graphite is obtained by, for example, oxidizing graphite as a raw material. The graphite may be natural or synthetic. Examples of methods for oxidizing graphite include known chemical or electrochemical methods such as Hummers method, Brodie method, and Staudenmaier method. The oxidized graphite has an oxygen-containing group, such as hydroxy, epoxy, or carboxy, between its layers or at its ends. As stated hereinafter, the composite to be produced will have siloxane immobilized in layers of oxidized graphite when the oxidized graphite has hydroxy groups.

The addition of the organic silicon compound to the oxidized graphite may be preceded by, for example, the addition of an alkylamine or cationic surfactant. The alkylamine or cationic surfactant infiltrates into the spaces between the layers of the oxidized graphite, increasing the interlayer distance of the oxidized graphite. This will help, later in the method, the organic silicon compound penetrate into the interlayer spaces in the oxidized graphite.

The alkylamine may be, for example, a liquid amine, such as butylamine or octylamine, or a solid amine, such as dodecylamine or hexadecylamine. When a liquid amine is used, the powder of oxidized graphite may be directly immersed in the amine. When a solid amine is used, the solid amine may be dissolved in an organic solvent (e.g., hexane), and the powder of oxidized graphite is immersed in the organic solvent that contains the amine. These methods yield a form of oxidized graphite in which the oxidized graphite contains the amine between its layers.

The cationic surfactant may be, for example, one that gives off hexadecyltrimethylammonium or octadecyltrimethylammonium ions in an aqueous solution. An aqueous solution of the surfactant is mixed with the oxidized graphite, the resulting mixture is filtered, and the residue is dried. This yields a form of oxidized graphite in which the oxidized graphite contains the surfactant between its layers.

[2-2. Preparation of Organic Silicon Compound]

The organic silicon compound can be of any kind. The organic silicon compound may be, for example, one that has a hydrolyzable functional group, such as an alkoxysilane or chlorosilane. Examples of alkoxysilanes include methoxysilane, which has a methoxy group ($-OCH_3$), and ethoxysilane, which has an ethoxy group ($-OCH_2CH_3$).

The organic silicon compound is, for example, an alkoxysilane that has no alkyl groups. Examples of alkoxysilanes that have no alkyl group directly bonded to the silicon atom include tetramethyl orthosilicate ($Si(OCH_3)_4$), tetraethyl orthosilicate ($Si(OC_2H_5)_4$), tetrapropyl orthosilicate ($Si(OC_3H_7)_4$), and tetrabutyl orthosilicate ($Si(OC_4H_9)_4$). When the alkoxysilane is methyl triethoxysilane ($CH_3Si(OC_2H_5)_3$) or 3-aminopropyl methyldiethoxysilane ($H_2N(CH_2)_3Si(CH_3)(OC_2H_5)_2$), whose Si—C bond does not break at temperatures lower than approximately 700° C., the reduction with Mg vapor (described hereinafter) may fail to produce silicon because of the failure to break the Si—C bond.

[2-3. Formation of Siloxane-Carbon Composite Material]

The organic silicon compound is added to the oxidized graphite, and the functional group of the organic silicon compound is subjected to hydrolysis and dehydration condensation. The hydrolysis of the functional group of the organic silicon compound produces hydroxy groups (—OH), and these hydroxy groups are condensed by dehydration synthesis. This yields siloxane, a compound having a siloxane bond (Si—O—Si). In addition, the hydroxy groups in the oxidized graphite and some of the hydroxy groups derived from the silicon compound are condensed by dehydration synthesis, forming carbon-siloxane bonds (C—O—Si). The siloxane is therefore immobilized between the layers of the oxidized graphite by the bonds to the oxidized graphite. A siloxane-carbon composite material is obtained in this way.

The conditions under which the organic silicon compound is hydrolyzed and condensed by dehydration synthesis are not limited. For example, a mixture of oxidized graphite with expanded interlayer spaces, an organic silicon compound, an organic solvent (e.g., toluene), and water is stirred at a temperature of room temperature to 80° C. to hydrolyze the organic silicon compound. The unreacted fractions of the organic compound and the organic solvent are removed from the oxidized graphite through, for example, centrifugation and/or filtration. The oxidized graphite is then dried to condense the silicon compound by dehydration synthesis, yielding siloxane.

The resulting siloxane-carbon composite material may be heated. The heat promotes the reduction of the oxygen-containing group in the oxidized graphite and the dehydration condensation between unreacted hydroxyl groups. The heating conditions are not limited. For example, the material may be heated at 500° C. in a vacuum. The material may be heated simultaneously with reduction later in the method.

[2-4. Reduction of Siloxane into Silicon]

The siloxane-carbon composite material is heated in the presence of magnesium vapor to reduce the siloxane into silicon. The siloxane has been immobilized between the layers of the oxidized graphite, the silicon particles produced from the siloxane are unlikely to diffuse and, therefore, unlikely to grow in size. As a result, fine particles of silicon are obtained.

Magnesium has a very high vapor pressure (e.g., 372 Pa) at its melting point (e.g., 650° C.). Heating the siloxane-carbon composite material in the presence of such magnesium vapor promotes the chemical reaction below, reducing the siloxane into silicon.

$$2Mg+SiO_2 \rightarrow 2MgO+Si$$

The heating conditions are not limited. Although the reducing reaction becomes more efficient with increasing temperature and vapor pressure of the magnesium vapor, heating at an extremely high temperature may lead to reduced surface area of magnesium due to melting and aggregation, thereby retarding vaporization of the magnesium. Heating is therefore effective when at a temperature close to the melting point of magnesium.

The magnesium source can be any material that produces magnesium vapor and may be, for example, magnesium in the form of a powder, lumps, ribbons, rods, or pellets. The magnesium is mixed with the siloxane-carbon composite material in, for example, a graphite or stainless steel container, and the resulting mixture is heated.

The atmosphere in which the mixture is heated is non-oxidizing. Examples of non-oxidizing atmospheres include a vacuum and atmospheres of inert gases such as nitrogen and argon. The non-oxidizing atmosphere limits the oxidation of the magnesium vapor, thereby helping the magnesium vapor reduce the siloxane.

[2-5. Removal of by-Product]

Removal of a component of the silicon-carbon composite material excluding silicon and carbon may follow. Examples of components other than silicon and carbon include $MgO$, $MgO_2$, $Mg_2Si$, and unreacted Mg. In the present disclosure, "removal of a component of the silicon-carbon composite material excluding silicon and carbon" refers to the removal of at least one of the minor components or at least some amount of a minor component of the material, and is not limited to the removal of all of them or the whole amount of it. After the removal of a minor component, therefore, the silicon-carbon composite material may still contain some amount of the minor component or another minor component.

For example, the silicon-carbon composite material may contain MgO besides silicon and a carbon material.

When the relative amount of magnesium to siloxane is more than stoichiometric, the silicon-carbon composite material may contain, besides unreacted Mg, magnesium silicide ($Mg_2Si$) resulting from the reaction below.

$$4Mg+SiO_2 \rightarrow Mg_2Si+2MgO$$

When the relative amount of magnesium to siloxane is less than stoichiometric, the silicon-carbon composite material may contain $MgO_2$ resulting from the reaction below.

$$Mg+SiO_2 \rightarrow MgO_2+Si$$

The removal of a component of the composite material excluding silicon and carbon may be achieved through, for example, washing in an aqueous solution of an acid or ammonium salt.

The aqueous solution of an acid or ammonium salt can be of any kind. An example of an aqueous solution of an acid is diluted hydrochloric acid. An example of an aqueous solution of an ammonium salt is an aqueous solution of ammonium chloride.

When containing $Mg_2Si$, the silicon-carbon composite material may be, for example, heated in a non-oxidizing atmosphere before being washed. The heating conditions are not limited. For example, the material may be heated at 650° C. in a vacuum. The heat decomposes $Mg_2Si$, vaporizes Mg, and crystallizes Si. This will, for example, prevent the reaction of $Mg_2Si$ and diluted hydrochloric acid during the subsequent washing operation.

[2-6. Addition of Amorphous Carbon]

Amorphous carbon may be added to the silicon-carbon composite material. The amorphous carbon, which serves as a conductive agent, can further stabilize the silicon-to-silicon and silicon-to-carbon material electrical connections in the composite material. Any method can be used to add the amorphous carbon. An example is to mechanically mix carbon black in the silicon-carbon composite material, and another is to mix a resin in the silicon-carbon composite material and then heat the mixture to transform the resin into amorphous carbon. The resin for the latter case can be of any kind. Examples of resins that may be used include polyvinyl alcohol (PVA), polyvinylidene fluoride (PVDF), and polyvinyl chloride (PVC).

[3. Lithium-Ion Battery]

A lithium-ion battery according to this embodiment includes an anode, a cathode, and an electrolyte. The anode contains a silicon-carbon composite material described above, and the electrolyte contains a lithium salt.

Figure 2:
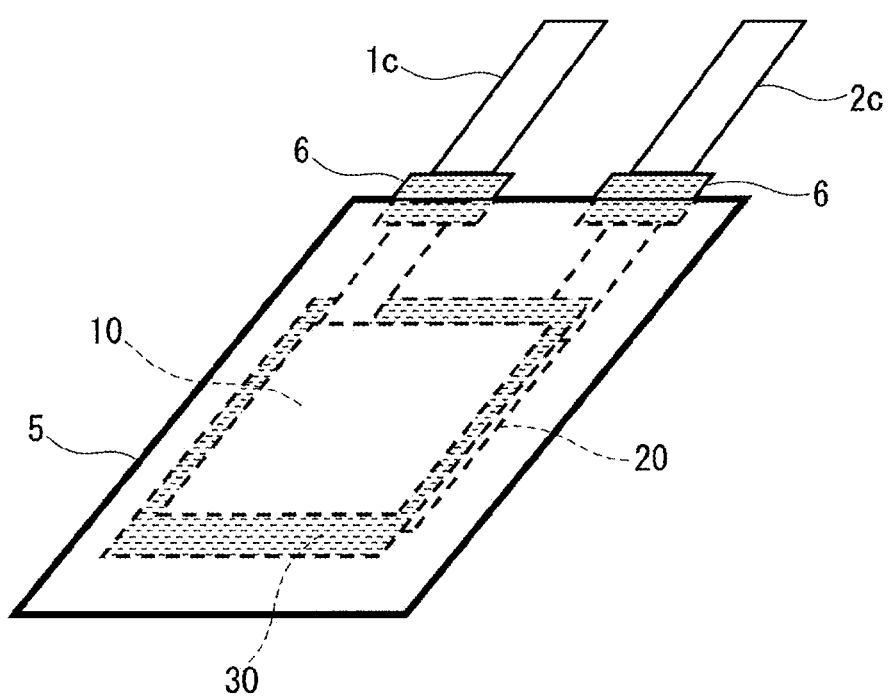
FIG. 2 is a perspective diagram that illustrates an example of a configuration of a lithium-ion battery according to this embodiment.

FIGS. 1 and 2 illustrate an example of a configuration of a lithium-ion battery.

As illustrated in FIGS. 1 and 2, the lithium-ion battery 100 has a plate set 4 and a package 5. The plate set 4 is in the package 5. The plate set 4 has a cathode 10, an anode 20, and a separator 30. The cathode 10 includes a cathode collector 1b and a cathode mixture layer 1a. The cathode mixture layer 1a is on the cathode collector 1b. The anode 20 includes an anode collector 2b and an anode mixture layer 2a. The anode mixture layer 2a is on the anode collector 2b. The cathode 10 and the anode 20 face each other with the separator 30 therebetween, and these components form the plate set 4. The plate set 4 has been impregnated with an electrolytic solution that contains a lithium salt (not illustrated). The cathode collector 1b is in connection with a cathode tab 1c. The anode collector 2b is in connection with an anode tab 2c. Each of the cathode tab 1c and the anode tab 2c extends out of the package 5. There is a dielectric film 6 between the cathode tab 1c and the package 5. There is another dielectric film 6 between the anode tab 2c and the package 5.

The cathode mixture layer 1a contains a cathode active material capable of storing and releasing lithium ions. Examples of cathode active materials include lithium cobalt oxide and other lithium metal oxides. The cathode mixture layer 1a may optionally contain a conductive agent, an ion conductor, and a binder. The cathode active material, the conductive agent, the ion conductor, and the binder can each be any known material.

The cathode collector 1b may be a sheet or film of a metallic material. The cathode collector 1b may be porous or non-porous.

The anode mixture layer 2a contains a silicon-carbon composite material described above. The anode mixture layer 2a may optionally contain a conductive agent, an ion conductor, and a binder.

The anode collector 2b may be a sheet or film of a metallic material. The anode collector 2b may be porous or non-porous.

The separator 30 may be a porous film of a material such as polyethylene, polypropylene, glass, cellulose, or a ceramic material. The electrolytic solution is loaded into pores in the separator 30.

The electrolytic solution contains, for example, a non-aqueous solvent and a lithium salt dissolved in the nonaqueous solvent. Examples of nonaqueous solvents include cyclic carbonates, linear carbonates, cyclic ethers, linear ethers, cyclic esters, linear esters, and fluorinated solvents. Examples of lithium salts include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$.

The lithium-ion battery may be in shapes such as a coin, a button, a stack of layers, a cylinder, a flat plate, and a block, besides a sheet as illustrated in FIGS. 1 and 2.

The Lithium-ion battery according to this embodiment can exhibit high capacities because of the presence of silicon in the anode active material. The anode active material in the battery enables good electrical connections to be maintained even when the silicon particles experience a change in volume after the anode active material absorbs lithium ions. This allows the lithium-ion battery to have highly durable.

The manufacture of the lithium-ion battery is not limited to any particular method. Any known method can be used.

[4. Experimental Results]

[4-1. Preparation of Samples]

The following describes the samples used in the experiment.

Flakes of natural graphite having an average particle diameter of 45 μm were prepared. The graphite was oxidized using Brodie method to give oxidized graphite. More specifically, the graphite was oxidized with fuming nitric acid and potassium chlorate over 3 hours at 60° C., and the product was washed in water, filtered out, and dried to give oxidized graphite.

Then 300 mg of the oxidized graphite was weighed out and transferred to a vial with a screw cap, and 5.9 ml of n-butylamine was added to the vial. The mixture of oxidized graphite and n-butylamine was heated at 60° C. for 3 hours with the screw cap on the vial.

After being allowed to cool to room temperature, the mixture was combined with 0.56 ml of water and 37.5 ml of toluene. The resulting mixture was stirred for 1 hour at room temperature and then with 5.4 ml of tetraethyl orthosilicate $(Si(OC_2H_5)_4)$ for 100 hours at 80° C. The product was washed in toluene and acetone and dried using a centrifuge. This yielded a composite of siloxane and a layered carbon material.

Then 58 mg of the composite was weighed out and heated at 500° C. in a vacuum on a stainless steel boat for 1 hour. Sample 1 was obtained in this way. The weight of sample 1 was 45 mg.

Sample 1, 45 mg, was then mixed with 28 mg of magnesium powder (particle diameters of 180 μm or less) in the boat. The resulting mixture was heated at 650° C. for 6 hours under a stream of nitrogen gas. Sample 2 was obtained in this way.

A mixture of sample 2 and 80 ml of 1 M hydrochloric acid was then stirred for 12 hours, washed in water, filtered out, and dried. Sample 3 was obtained in this way. Sample 3 was a silicon-carbon composite material and corresponds to Example 1 of this Embodiment.

A mixture of 45 mg of a sample prepared in the same way as sample 1 and 35 mg of magnesium powder (particle diameters of 180 µm or less) was tightly sealed in a metallic container having an evacuation line and a stop valve, and the container was evacuated. The container was then heated at 650° C. for 6 hours with a stream of nitrogen gas running along its outer surface. Sample 4 was obtained in this way.

Sample 4 was heated at 650° C. in a vacuum on a stainless steel boat for 6 hours. Sample 5 was obtained in this way.

A mixture of sample 5 and 80 ml of 1 M hydrochloric acid was then stirred for 12 hours, washed in water, filtered out, and dried. Sample 6 was obtained in this way. Sample 6 was a silicon-carbon composite material and corresponds to Example 2 of this embodiment.

An aqueous solution of PVA (polyvinyl alcohol) was prepared by adding 100 ml of water to 0.8 g of PVA and stirring the mixture. To this aqueous solution, 0.5 g of a sample prepared in the same way as sample 3 was added. The resulting mixture was degassed in a vacuum and then dried at 80° C. for 16 hours. The product was heated at 600° C. for 6 hours in a nitrogen gas atmosphere to carbonize the PVA into amorphous carbon. Sample 7 was obtained in this way. Sample 7 was a silicon-carbon composite material containing amorphous carbon and corresponds to Example 3 of this embodiment.

[4-2. Silicon-to-Carbon Weight Ratio]

Sample 3 was analyzed for the ratio by weight of silicon to carbon. To do this, 0.1000 g of sample 3 was weighed out and heated at 1000° C. for 6 hours in air in an alumina boat. This oxidatively decomposed carbon in the sample and oxidized silicon into silicon oxide ($SiO_2$). The weight of the resulting silicon oxide was 0.0960 g. Assuming that the amount of substance of silicon in the silicon oxide ($SiO_2$) was equal to that in sample 3 before heating, the silicon-to-carbon weight ratio of sample 3 was 55:45.

Sample 7 was analyzed for the ratios by weight of silicon to layered carbon to amorphous carbon. To do this, 0.1000 g of sample 7 was weighed out and heated at 1000° C. for 6 hours in air in an alumina boat. This oxidatively decomposed carbon and amorphous carbon in the sample and oxidized silicon into silicon oxide ($SiO_2$). The weight of the resulting silicon oxide was 0.0830 g. Assuming that the amount of substance of silicon in the silicon oxide ($SiO_2$) was equal to that in sample 7 before heating, the weight of silicon was 0.0388 g. Given that sample 7 was obtained by adding amorphous carbon to sample 3, the weight of carbon was 0.0474 g based on the silicon-to-carbon weight ratio of sample 3, 55:45. Subtracting the weights of silicon and carbon from the weight of sample 7 gives the weight of amorphous carbon, and it was 0.0138 g. The weight ratios of silicon to layered carbon to amorphous carbon in sample 7 were therefore 39:47:14.

[4-3. X-Ray Diffraction Analysis]

Samples 1 to 6 were analyzed by X-ray diffraction with Cu-Kα radiation.

Figure 3:
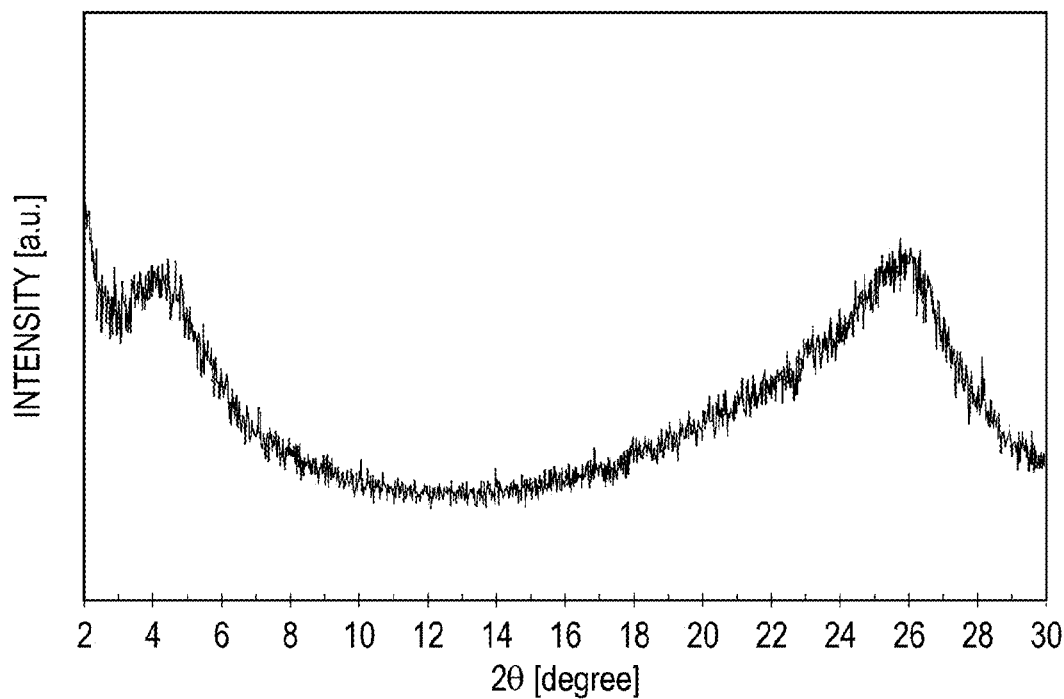
FIG. 3 illustrates an X-ray diffraction chart of sample 1.

FIG. 3 illustrates an X-ray diffraction chart of sample 1.

The X-ray diffraction pattern of sample 1 had a peak at a diffraction angle (2θ) of approximately 4.3°. This peak indicates that sample 1 had a layered structure with an interlayer distance of approximately 2.05 nm. The inventors believe that this layered structure resulted from the formation of siloxane in the spaces between the layers of oxidized graphite. The X-ray diffraction pattern of sample 1 also had a peak at a diffraction angle (2θ) of approximately 25.8°. This peak is of layered carbon. The X-ray diffraction pattern in FIG. 3 did not have a peak at a diffraction angle 2θ of 28.5°, a peak that corresponds to the (111) plane of silicon.

Figure 4:
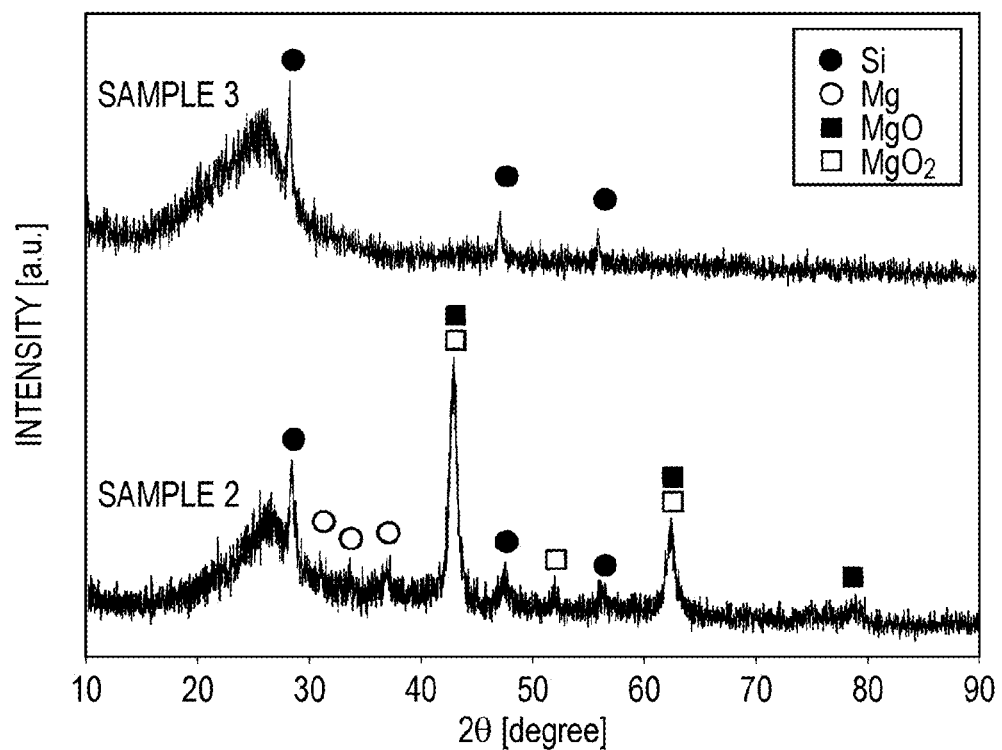
FIG. 4 illustrates X-ray diffraction charts of samples 2 and 3.

FIG. 4 illustrates X-ray diffraction charts of samples 2 and 3.

The X-ray diffraction pattern of sample 2 had peaks of silicon (Si), magnesium oxide (MgO), magnesium dioxide (MgO2), and unreacted magnesium (Mg). The X-ray diffraction pattern of sample 2 also had a peak of layered carbon at a diffraction angle (2θ) of approximately 25.8°. Comparing the X-ray diffraction pattern of sample 1 in FIG. 3 with that of sample 2 in FIG. 4 reveals that the siloxane that had been contained in sample 1 was reduced into silicon by magnesium.

The X-ray diffraction pattern of sample 3 had only peaks of silicon (Si) and layered carbon. The analytical results for samples 2 and 3 demonstrate that washing with diluted hydrochloric acid removed magnesium oxide (MgO), magnesium dioxide ($MgO_2$), and unreacted magnesium (Mg).

Figure 5:
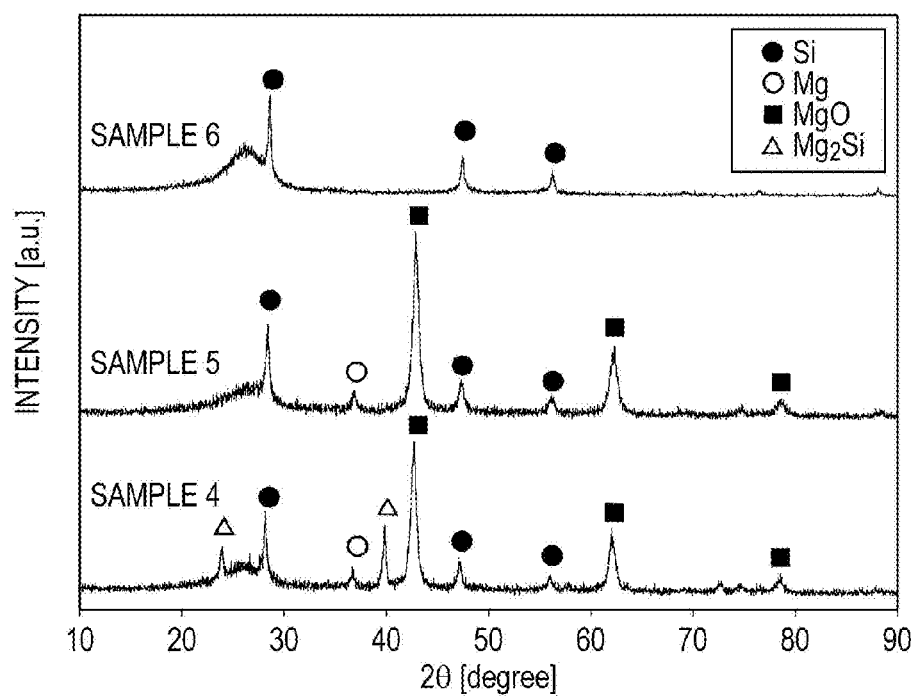
FIG. 5 illustrates X-ray diffraction charts of samples 4 to 6.

FIG. 5 illustrates X-ray diffraction charts of samples 4, 5, and 6.

The X-ray diffraction pattern of sample 4 had peaks of silicon (Si), magnesium oxide (MgO), unreacted magnesium (Mg), and $Mg_2Si$. The X-ray diffraction pattern of sample 4 also had a peak of layered carbon at a diffraction angle (2θ) of approximately 25.8°.

The X-ray diffraction pattern of sample 5, unlike that of sample 4, had no peak of $Mg_2Si$. This indicates that heating at 650° C. in a vacuum decomposed $Mg_2Si$.

The X-ray diffraction pattern of sample 6 had only peaks of silicon (Si) and layered carbon. The analytical results for samples 5 and 6 demonstrate that washing with diluted hydrochloric acid removed magnesium oxide (MgO), magnesium dioxide ($MgO_2$), and unreacted magnesium (Mg).

[4-4. TEM Analysis]

Sample 3 was analyzed under a TEM (transmission electron microscope).

Figure 6:
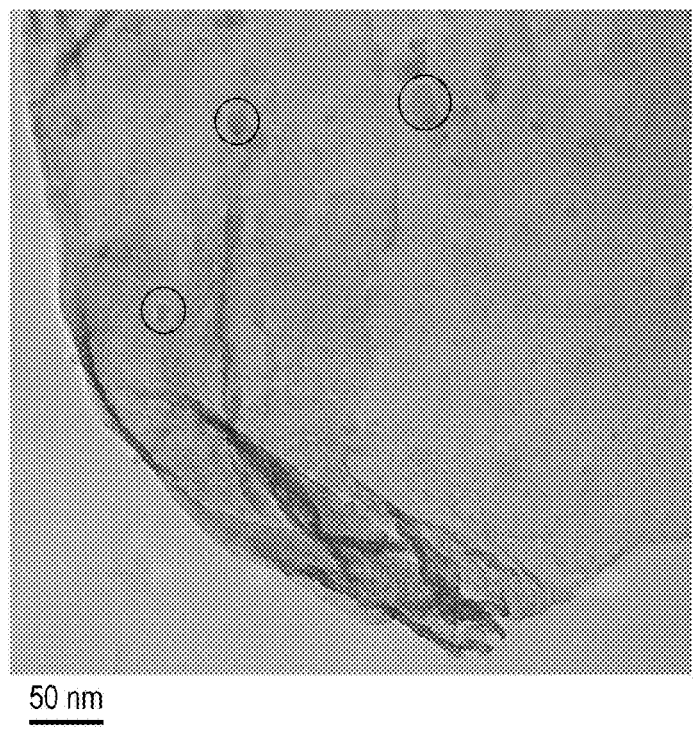
FIG. 6 illustrates sample 3 as observed under a transmission electron microscope (TEM)

FIG. 6 illustrates sample 3 as observed under a TEM. The circles in FIG. 6 represent silicon existing between the layers of layered graphene. The diameters of the (secondary) silicon particles were less than 50 nm.

Figure 7:
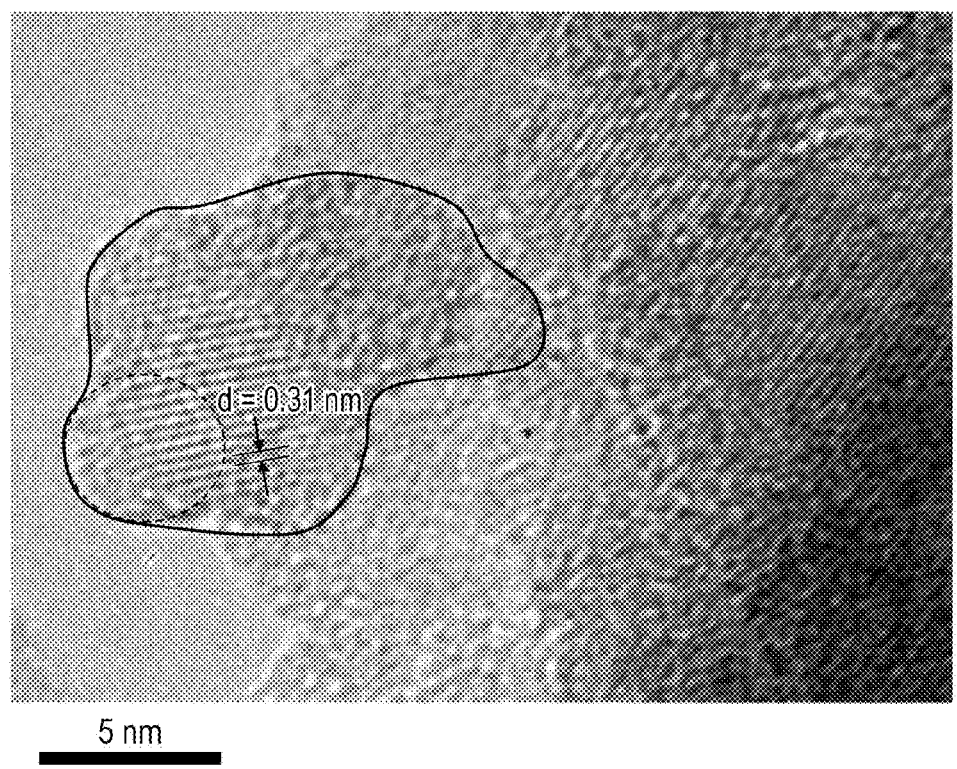
FIG. 7 illustrates sample 3 as observed under a high-resolution transmission electron microscope (HR-TEM)

FIG. 7 illustrates sample 3 as observed under a high-resolution transmission electron microscope (HR-TEM). In FIG. 7, crystal lattice fringes were observed. The width of a lattice fringe based on the contrast ratio was 0.31 nm. Given that the calculated width was equal to the plane distance $d_{111}$ of the (111) plane of silicon, 0.31 nm, this should be a crystal of silicon. FIG. 7 demonstrates that primary particles having a diameter of approximately 3 nm aggregated and formed a secondary particle. In FIG. 7, the solid outline represents a secondary particle of silicon, and the broken outline represents a primary particle of silicon. The part of FIG. 7 excluding the areas with fringes, i.e., the areas occupied by silicon, corresponds to graphene in a layered structure.

[4-5. Characteristics of Lithium-Ion Battery]

A laminated half-cell of a lithium-ion battery was fabricated using sample 7.

Sample 7, acetylene black as a conductive agent, and polyvinylidene fluoride as a binder were mixed in weight ratios of 85:5:10 using a mortar. The mixture was slurried with N-methyl-2-pyrrolidone. The resulting electrode mixture slurry was applied to a 10 µm thick foil of copper, and the coating was dried. The resulting electrode mixture layer was rolled to a total electrode thickness of 20 µm. A 20 mm×20 mm piece was punched out, and a nickel tab was attached to form a working electrode. The weight of the electrode mixture layer was 4.4 mg.

The counter electrode was a 25 mm×25 mm piece of lithium cut out of a 42 μm thick foil with a nickel tab attached thereto.

The separator was a piece of "UPORE" polyolefin microporous film (Ube Industries, Ltd.). The thickness of the separator was 30 μm.

A stack of the working electrode, counter electrode, and separator was put into a cell package made from aluminum laminated film. The package was loaded with 0.3 cm$^3$ of an electrolytic solution (Mitsubishi Chemical) that contained 1 M lithium hexafluorophosphate and a nonaqueous solvent composed of ethylene carbonate and ethyl methyl carbonate (a ratio by volume of 1:3), and the stack was impregnated with this solution. After degassing in a vacuum, the laminated film was heat-sealed to complete a laminated half-cell.

Figure 8:
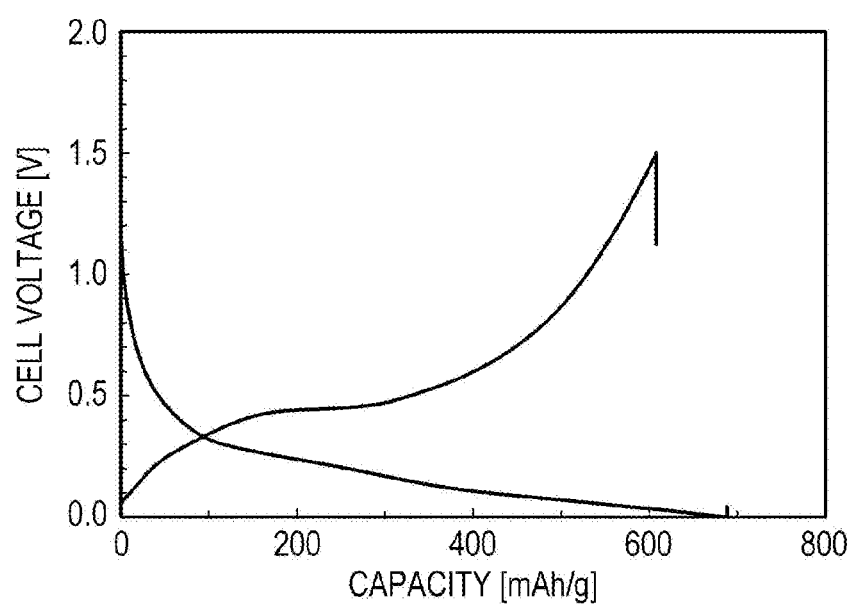
FIG. 8 illustrates charge-discharge curves of a laminated half-cell fabricated using sample 7.

FIG. 8 illustrates initial charge-discharge characteristics of the laminated half-cell. The charge and discharge was performed with a constant current of 0.29 mA, and then the current was stopped when a voltage at discharge reached 1.5 V. FIG. 8 illustrates charge-discharge curves of the second cycle, which shows that the charge capacity was 688 mAh/g and the discharge capacity was 608 mAh/g.

Silicon-carbon composite materials according to the present disclosure may be applied to, for example, anode materials for lithium-ion batteries. An anode that contains this composite material gives a lithium-ion battery a high capacity and high durability.

What is claimed is:

1. A silicon-carbon composite material comprising:
   layers of carbon material; and
   secondary particles of silicon held between the layers of carbon material, each of the secondary particles of silicon being an aggregate of primary particles of silicon, at least one of the primary particles of silicon having a diameter of 3 nm or more, and
   at least one of the secondary particles of silicon, which includes the at least one of the primary particles of silicon, having a diameter of 50 nm or less.

2. The silicon-carbon composite material according to claim 1, wherein:
   the diameter of the at least one of the primary particles of silicon is less than 20 nm; and
   the diameter of the at least one of the secondary particles of silicon is 5 nm or more.

3. The silicon-carbon composite material according to claim 1, wherein:
   the primary particles of silicon have an average diameter of 3 nm or more; and
   the secondary particles of silicon have an average diameter of 50 nm or less.

4. The silicon-carbon composite material according to claim 3, wherein:
   the average diameter of the primary particles of silicon is less than 20 nm; and
   the average diameter of the secondary particles of silicon is 5 nm or more.

5. The silicon-carbon composite material according to claim 1, further comprising amorphous carbon.

6. A lithium-ion battery comprising:
   an anode that contains the silicon-carbon composite material according to claim 1;
   a cathode; and
   an electrolyte that contains a lithium salt.

* * * * *